(12) United States Patent
Schroeren et al.

(10) Patent No.: US 12,529,671 B2
(45) Date of Patent: Jan. 20, 2026

(54) MEASURING CELL WITH ANTI-TWIST PROTECTION

(71) Applicant: Optek-Danulat GmbH, Essen (DE)

(72) Inventors: Peter Schroeren, Kempen (DE); Daniel Platte, Velbert (DE)

(73) Assignee: OPTEK-DANULAT GMBH, Essen (DE)

(*) Notice: Subject to any disclaimer, the term of this patent is extended or adjusted under 35 U.S.C. 154(b) by 312 days.

(21) Appl. No.: 18/023,762

(22) PCT Filed: Oct. 27, 2021

(86) PCT No.: PCT/EP2021/079838
§ 371 (c)(1),
(2) Date: Feb. 28, 2023

(87) PCT Pub. No.: WO2022/135773
PCT Pub. Date: Jun. 30, 2022

(65) Prior Publication Data
US 2024/0011932 A1    Jan. 11, 2024

(30) Foreign Application Priority Data

Dec. 22, 2020 (EP) .................................. 20216674

(51) Int. Cl.
*G01N 27/28* (2006.01)
*G01N 27/30* (2006.01)
*G01N 27/416* (2006.01)

(52) U.S. Cl.
CPC ......... *G01N 27/283* (2013.01); *G01N 27/302* (2013.01); *G01N 27/4165* (2013.01)

(58) Field of Classification Search
CPC .............. G01N 27/283; G01N 27/302; G01N 27/4165; G01N 21/05; F16L 33/30
See application file for complete search history.

(56) References Cited

U.S. PATENT DOCUMENTS 3,382,892 A * 5/1968 Cerbin .................. F16L 37/373
285/70
3,513,436 A * 5/1970 Nodfelt ................ H01R 13/625
439/314
4,531,802 A * 7/1985 Tomsa ................. H01R 13/625
439/314

(Continued)

FOREIGN PATENT DOCUMENTS

DE         19714203 A1 * 10/1998 ........... G01N 27/407
DE         199 07 798 C1    7/2000
(Continued)

OTHER PUBLICATIONS

Machine translation of DE19714203 (Year: 1998).*
(Continued)

*Primary Examiner* — David J Bolduc
(74) *Attorney, Agent, or Firm* — RENNER, OTTO, BOISSELLE & SKLAR, LLP

(57) ABSTRACT

The present invention relates to a measuring cell with an anti-twist protection, the connection adapter with an anti-twist protection and a system comprising a measuring cell according to the invention and a connection adapter according to the invention.

4 Claims, 3 Drawing Sheets

(56) References Cited

U.S. PATENT DOCUMENTS

| | | | | |
|---|---|---|---|---|
| 5,662,488 | A * | 9/1997 | Alden | H01R 13/625 439/314 |
| 5,785,357 | A * | 7/1998 | Foster | F16L 15/08 285/86 |
| 5,799,987 | A * | 9/1998 | Sampson | F16L 37/36 285/423 |
| 5,823,702 | A * | 10/1998 | Bynum | F16L 19/005 285/82 |
| 5,853,202 | A * | 12/1998 | Li | F16L 33/30 285/259 |
| 6,000,290 | A * | 12/1999 | Benton | G01L 19/0007 73/866.5 |
| 6,162,082 | A * | 12/2000 | Karsten | H01R 13/523 439/321 |
| 6,394,856 | B1 * | 5/2002 | Wertz | H01R 13/645 439/681 |
| 7,264,517 | B1 * | 9/2007 | Piromalli | H01R 13/6456 439/314 |
| 7,857,506 | B2 * | 12/2010 | Schick | G01N 27/10 324/705 |
| 2005/0093298 | A1 * | 5/2005 | Takayanagi | B60K 15/01 285/239 |
| 2006/0226175 | A1 * | 10/2006 | Sledzieski | F16L 33/30 222/382 |
| 2007/0001457 | A1 * | 1/2007 | Aas | F16L 15/08 285/401 |
| 2013/0102178 | A1 * | 4/2013 | Van Swearingen | H01R 13/641 439/314 |
| 2014/0054186 | A1 * | 2/2014 | Riechers | C12M 41/00 356/246 |
| 2015/0180167 | A1 * | 6/2015 | Haas | H01R 13/64 439/311 |
| 2017/0356874 | A1 * | 12/2017 | Nakamura | G01N 27/409 |
| 2019/0025239 | A1 * | 1/2019 | Robl | G01D 11/24 |
| 2020/0057015 | A1 * | 2/2020 | Barcella | G01N 27/403 |
| 2020/0197685 | A1 * | 6/2020 | Steele | F16L 37/0847 |
| 2021/0072177 | A1 * | 3/2021 | Okai | G01N 27/4078 |
| 2021/0123936 | A1 * | 4/2021 | Swanson | B01F 35/1452 |
| 2021/0355981 | A1 * | 11/2021 | Chu | F16B 31/028 |

FOREIGN PATENT DOCUMENTS

| | | |
|---|---|---|
| DE | 10 2011 013 001 A1 | 9/2012 |
| DE | 10 2012 102 642 A1 | 10/2013 |
| EP | 3 699 468 A1 | 8/2020 |
| JP | 2004-258040 A | 9/2004 |

OTHER PUBLICATIONS

International Search Report from corresponding International Patent Application No. PCT/EP2021/079838, dated Jan. 21, 2022.
Written Opinion from corresponding International Patent Application No. PCT/EP2021/079838, dated Jan. 21, 2022.

* cited by examiner

MEASURING CELL WITH ANTI-TWIST PROTECTION

FIELD OF THE INVENTION

The present invention relates to a measuring cell, a connection adapter and a system according to the coordinated claims.

BACKGROUND OF THE INVENTION

In the case of conventional measuring cells, it has been shown in operation that the assembly of connection hoses to the measuring cells is problematic on account of the high torques.

SUMMARY OF THE INVENTION

The aim of the present invention is to eliminate the drawbacks of the prior art and in particular to improve the assembly of the measuring cells to the connection hoses.

This aim is accomplished with the features of the coordinated claims. Advantageous developments of the invention are given in the sub-claims. All combinations of at least two features disclosed in the description, the claims and/or the figures also fall within the scope of the invention. In the case of stated value ranges, values lying within the stated limits should also be deemed to be disclosed as limiting values and can be claimed in any combination. To prevent repetition, features disclosed according to the system are also deemed to be disclosed and are claimed as being according to the device. Likewise, features disclosed according to the device are also deemed to be disclosed and are claimed as being according to the system.

According to the invention, a measuring cell with at least one opening for a fluid is provided, wherein the measuring cell comprises at least one anti-twist protection device, wherein the at least one anti-twist protection device is arranged at the at least one opening, wherein the at least one anti-twist protection device is designed to act in a form-fitting manner.

As a result of the form-fit effect of the at least one anti-twist protection device, it is advantageously possible to produce the anti-twist protection in a straightforward manner. In particular, no firmly bonded connection is needed, so that for example no welding needs to be carried out. Moreover, the form-fit connection enables an easy connection and detachment of the anti-twist protection and thus an easy assembly and dismantling of the connection between the measuring cell and a connection hose or a connection adapter of a connection hose.

The measuring cell can be a flow-through measuring cell, which comprises an inlet opening for the inflow of a fluid and an outlet opening for the outflow of the fluid. Alternatively, the measuring cell can be a tank, which has only a single opening for the fluid to flow in or flow out.

In particular, the measuring cell is a pH measuring cell, in particular a flow-through pH measuring cell. Other measurements of properties of a fluid can however also take place in the measuring cell. Conductivity measurements, electrochemical measurements, temperature measurements and measurements of interactions with electromagnetic radiation, in particular an optical absorption measurement, can in particular be carried out with the measuring cell.

Provision is preferably made such that the at least one anti-twist protection device comprises a plurality of teeth. It is thus advantageously possible for a torque, which occurs at the at least one opening, to be absorbed particularly efficiently, so that undesired twisting can be prevented.

The torque is absorbed particularly efficiently if the teeth are preferably arranged, in particular equidistant, around the at least one opening, in particular in a ring-shaped manner.

The invention also relates to a connection adapter for connection to at least one opening of the measuring cell according to the invention, comprising:
- a connection piece for connecting a line for a fluid,
- a locating section for locating the at least one opening of the measuring cell, and
- an anti-twist protection device, wherein the anti-twist protection device is designed for the form-fitting engagement in the least one anti-twist protection device at the at least one opening of the measuring cell.

It is thus advantageously possible to produce a connection between the anti-twist protection device on the measuring cell and the anti-twist protection device on the connection adapter, with which a torque can be absorbed particularly efficiently. In particular, a form-fit connection can advantageously be produced, so that a particularly easily detachable and reproducible connection can be achieved.

By means of the form-fit effect of the anti-twist protection device, it is advantageously possible to produce the anti-twist protection in an easy manner. In particular, a firmly bonded connection is not required, so that for example no welding needs to be carried out. In addition, the form-fit connection enables an easy connection and detachment of the anti-twist protection and thus easy assembly and dismantling of the connection between the measuring cell and the connection adapter.

Provision is preferably made such that the anti-twist protection device comprises a plurality of teeth, wherein the teeth are preferably arranged, in particular equidistant, around the locating section, in particular in a ring-shaped manner. A particularly efficient absorption of a torque is thus advantageously possible. In particular, the anti-twist protection device is constituted in a snap-on manner with the at least one anti-twist protection device of the measuring cell, as a result of which a particularly easy assembly and dismantling can be enabled.

The anti-twist protection device is designed in particular in such a way that it can absorb the highest possible torque with the smallest possible assembly space and material consumption. It is particularly advantageous if the anti-twist protection device experiences a small radially directed reaction force when a torque is applied to the contact surfaces.

In particular, loaded contact surfaces of the anti-twist protection device can be secured in the radial direction against radial slipping by form-fitting (e.g. by a convex and/or concave formation). Furthermore, particularly for production-related simplification, the anti-twist protection device can be provided with at least essentially radially orientated contact surfaces.

Furthermore, it is particularly advantageous if the anti-twist protection device of the measuring cell and of the connection adapter have roughly the same load-bearing capacity.

Furthermore, it is particularly advantageous to fasten the anti-twist protection device only on one lateral surface (e.g. a cylindrical lateral surface and/or on an annular end face) to the anti-twist protection device of the other part.

The teeth of the anti-twist protection of the connection adapter contact the teeth of the anti-twist protection of the measuring cell at contact surfaces. The contact surfaces are defined in each case by a height H and a width B of the teeth.

In particular, an especially high load-bearing capacity advantageously results if the ratio of width B to height H of a tooth or a plurality of teeth of the measuring cell and/or of the connection adapter is in the range 0.5≤B/H≤2, preferably 1/1.2≤B/H≤1/0.8, particularly preferably B/H is approximately equal to 1.

The contact surfaces of the teeth of the anti-twist protection of the connection adapter and/or the teeth of the anti-twist protection of the measuring cell are preferably rectangular, in particular square.

According to the invention, furthermore, a system comprising a measuring cell according to the invention and at least one connection adapter according to the invention is provided. For preferred embodiments and effects and advantages, reference is made to the above explanations for the measuring cell according to the invention and for the connection adapter according to the invention.

It is particularly advantageous to constitute the measuring cell at least partially, preferably predominantly of plastic and/or rubber. A cost-effective production of the measuring cell is thus possible. Moreover, the measuring cell can be designed as a one-way measuring cell.

The measuring cell can be produced as a one-way measuring cell, in particular produced from predominantly, preferably at least 90%, still more preferably at least 95% chemical elements with an ordinal number less than 17.

The measuring cell is thus gamma-permeable insofar as a complete and homogeneous exposure of the measurement chamber to gamma rays for disinfection as possible. In this way, the production for dispatch or transport of the measuring cells according to the invention is greatly simplified, since the measuring cells can be exposed to gamma rays and duly disinfected in the packaged state. Contamination during the packaging of the measuring cells is thus excluded and the packaging can be carried out correspondingly cost-effectively.

BRIEF DESCRIPTION OF THE DRAWINGS

Further advantages, features and details of the invention emerge from the following description of preferred examples of embodiment and with the aid of the drawings. The latter show.

DETAILED DESCRIPTION OF THE INVENTION

Identical elements and elements with the same functions are denoted by the same reference numbers in the figures.

Figure 1:
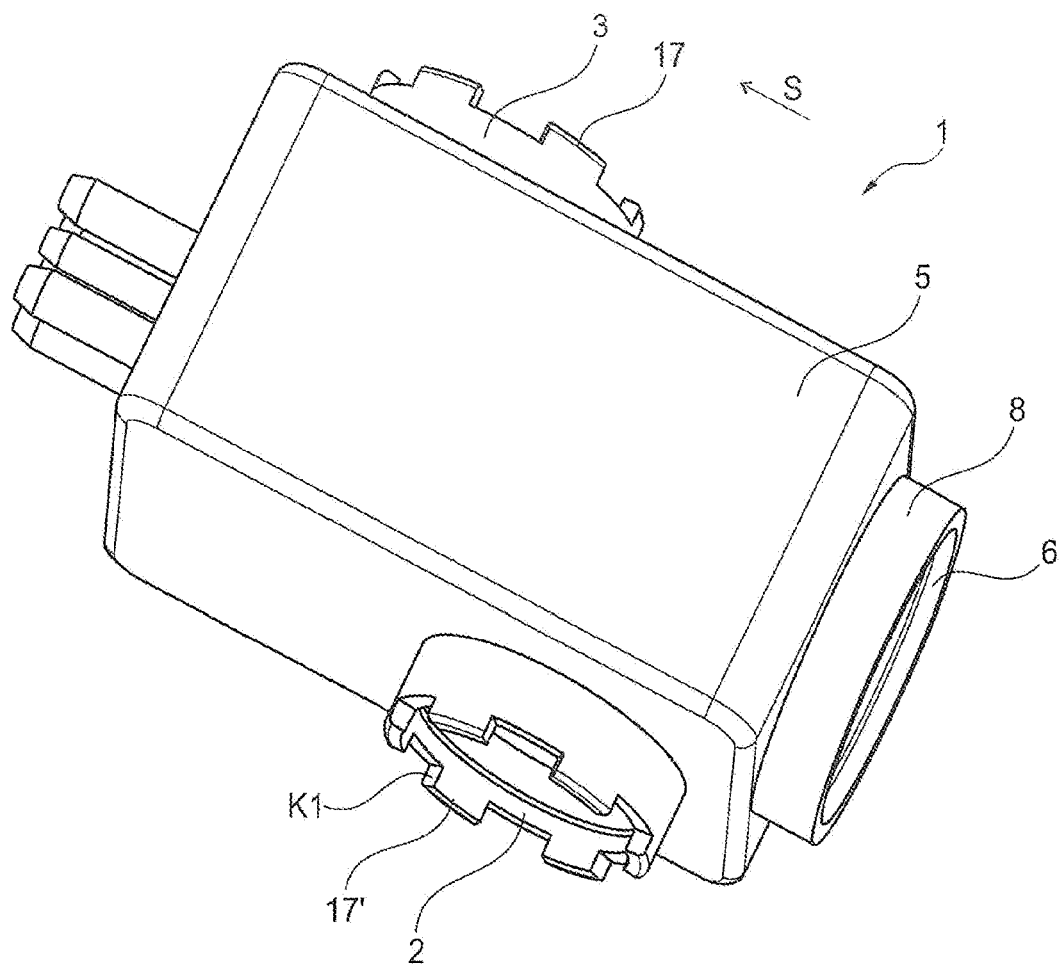
FIG. 1 shows a perspective view of a measuring cell according to the invention.

FIG. 1 shows an exemplary measuring cell 1 according to the invention, wherein measuring cell 1 in this embodiment is constituted as a fluid flow-through pH measuring cell 1. However, other measuring cells are also conceivable, in particular measuring cells which are constituted as a tank with only one opening or measuring cells which measure magnitudes other than the pH value.

Measuring cell 1 includes a measurement chamber 4 bounded by a measuring cell body 5. The fluid flows through measurement chamber 4, the pH value of which is measured with a combination electrode (not represented) insertable into measurement chamber 4 in insertion direction S through insertion opening 6 of pH measurement locating section 8 positioned in shoulder 12 of measuring cell body 5. The measuring cell 1 includes an inlet opening 2 for the inflow of the fluid and an outlet opening 3 for the outflow of the fluid.

An anti-twist protection device 17' is arranged at inlet opening 2 and a further anti-twist protection device 17 is arranged at outlet opening 3. Anti-twist protection devices 17, 17' are constituted as tooth systems with a plurality of teeth 17, 17', which are arranged in a ring-shaped and equidistant manner.

Figure 2:
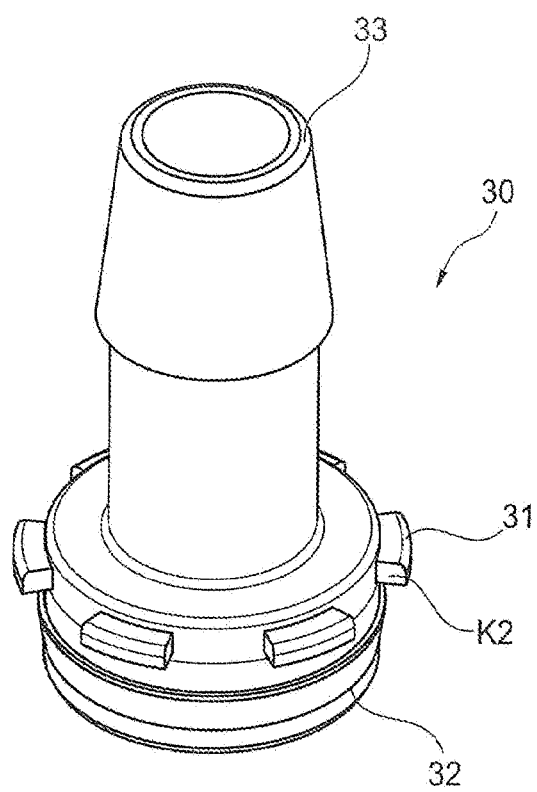
FIG. 2 shows a perspective view of a connection adapter according to the invention.

FIG. 2 shows an example of embodiment of a connection adapter according to the invention, through which the fluid is fed and discharged. Connection adapter 30 is connected with its locating section 32 to inlet opening 2 or outlet opening 3 of measuring cell 1. This connection is in particular a plug-in connection, in particular a detachable or non-detachable snap-on connection. Located at the other end of connection adapter 30 is a connection piece 33, to which a line can be connected for the fluid.

Connection adapter 30 includes an anti-twist protection device 31, 31'. Anti-twist protection device 31, 31' is constituted as a tooth system 31, 31' with a plurality of teeth 31, 31', which are arranged in a ring-shaped and equidistant manner. Anti-twist protection device 31, 31' engages in anti-twist protection device 17, 17' of connected inlet opening 2 or outlet opening 3 and prevents unintended twisting during the operation of measuring cell 1.

Teeth 17, 17' of measuring cell 1 include contact surfaces K1. Teeth 31, 31' of connection adapter 30, 30' include contact surfaces K2. In the connected state, contact surfaces K1 make contact with contact surfaces K2 and form the desired anti-twist protection. Contact surfaces K1, K2 are selected square in this example of embodiment.

Figure 3:
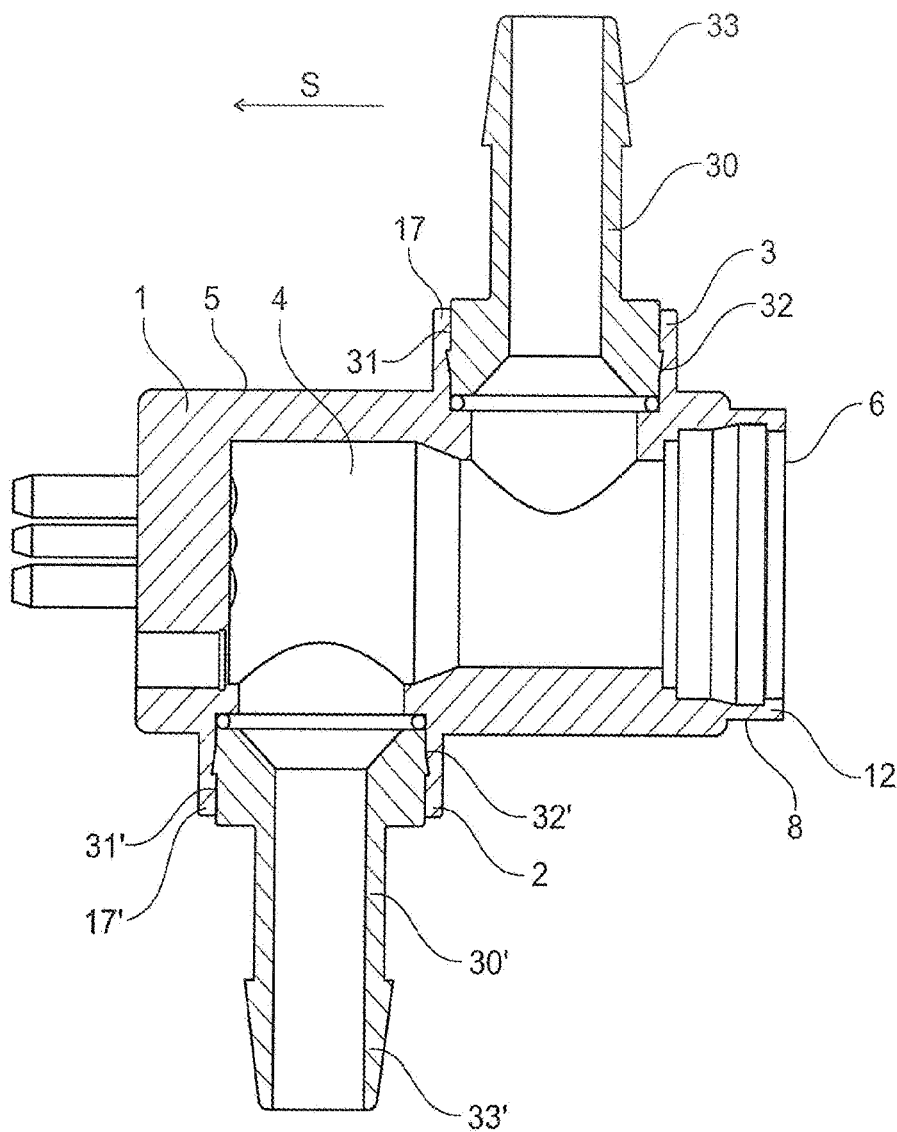
FIG. 3 shows a diagrammatic view of the measuring cell according to the invention with two connection adapters according to the invention.

FIG. 3 shows a diagrammatic view of measuring cell 1 according to the invention with two connection adapters 30, 30' according to the invention, which are connected to inlet opening 2 and respectively outlet opening 3. Each connection adapter 30, 30' includes an anti-twist protection device 31, 31' in respective locating section 32, 32'. Respective anti-twist protection device 31, 31' engages in respective anti-twist protection device 17, 17' of connected inlet opening 2 and respectively outlet opening 3 and prevents unintended twisting of connection adapter 30, 30' during the operation of measuring cell 1. Located at each connection adapter 30, 30' is a connection piece 33, 33' for the connection of lines for the fluid.

The above embodiments serve merely as an illustrative explanation of the invention are under no circumstances are intended to limit the present invention in any way.

LIST OF REFERENCE NUMBERS 1 measuring cell
2 inlet opening
3 outlet opening
4 measurement chamber
5 measuring cell body
6 insertion opening
8 pH measurement locating section
12 shoulder
17, 17' anti-twist protection device, teeth
30' connection adapter
31, 31' anti-twist protection device, teeth
32, 32' locating section
33, 33' connecting piece
S insertion direction

What is claimed is:

1. A measuring cell, comprising:
a measurement chamber bounded by a measuring cell body;
at least one opening formed in the measurement chamber and extending longitudinally away from the measuring cell body to allow fluid to flow therethrough into and out of the measurement chamber; and
at least one anti-twist protection device arranged on an outer surface of the measurement chamber at the at least one opening, the at least one anti-twist protection device comprising an annular ring of teeth arranged around a rim of the at least one opening and projecting longitudinally from the rim away from the measuring cell body, the teeth being equidistantly spaced in a ring-shaped manner from each other,
wherein the at least one anti-twist protection device acts in a form-fitting manner.

2. A connection adapter for connection to a measuring cell, the measuring cell including a measurement chamber bounded by a measuring cell body, at least one opening formed in the measurement chamber and extending longitudinally away from the measuring cell body to allow fluid to flow therethrough into and out of the measurement chamber, and at least one measuring cell anti-twist protection device arranged on an outer surface of the measurement chamber at the at least one opening, the at least one measuring cell anti-twist protection device acting in a form-fitting manner, the at least one measuring cell anti-twist protection device including an annular ring of measuring cell opening teeth arranged around a rim of the at least one opening and projecting longitudinally from the rim away from the measuring cell body, the measuring cell opening teeth being equidistantly spaced in a ring-shaped manner from each other, the connection adapter comprising:
a connection piece configured to connect a line for a fluid,
a locating section configured to locate the at least one opening of the measuring cell, and
a locating section anti-twist protection device in the locating section, the locating section anti-twist protection device being formed as an annular ring of locating section teeth arranged equidistantly in a ring-shaped manner around the locating section and projecting radially outward from the locating section, the locating section teeth being designed to engage the measuring cell opening teeth of the at least one measuring cell anti-twist protection device at the at least one opening of the measuring cell in the form-fitting manner.

3. The connection adapter according to claim 2, wherein the locating section anti-twist protection device is snapped on with the least one measuring cell anti-twist protection device.

4. A system, comprising:
a measuring cell, comprising:
a measurement chamber bounded by a measuring cell body;
at least one opening formed in the measurement chamber and extending longitudinally away from the measuring cell body to allow fluid to flow therethrough into and out of the measurement chamber; and
at least one measuring cell anti-twist protection device arranged on an outer surface of the measurement chamber at the at least one opening, the at least one measuring cell anti-twist protection device acting in a form-fitting manner, the at least one measuring cell anti-twist protection device including an annular ring of measuring cell opening teeth arranged around a rim of the at least one opening and projecting longitudinally from the rim away from the measuring cell body, the measuring cell opening teeth being equidistantly spaced in a ring-shaped manner from each other; and
at least one connection adapter, comprising:
a connection piece configured to connect a line for a fluid,
a locating section configured to locate the at least one opening of the measuring cell, and
a locating section anti-twist protection device in the locating section, the locating section anti-twist protection device being formed as an annular ring of locating section teeth arranged equidistantly in a ring-shaped manner around the locating section and projecting radially outward from the locating section, the locating section teeth being designed to engage the measuring cell opening teeth of the at the at least one measuring cell anti-twist protection device at the at least one opening of the measuring cell in the form-fitting manner.

* * * * *